US011573872B2

(12) United States Patent
Alben et al.

(10) Patent No.: US 11,573,872 B2
(45) Date of Patent: Feb. 7, 2023

(54) LEVERAGING LOW POWER STATES FOR FAULT TESTING OF PROCESSING CORES AT RUNTIME

(71) Applicant: NVIDIA Corporation, Santa Clara, CA (US)

(72) Inventors: Jonah Alben, San Jose, CA (US);
Sachin Idgunji, San Jose, CA (US);
Jue Wu, Los Gatos, CA (US);
Shantanu Sarangi, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/556,473

(22) Filed: Dec. 20, 2021

(65) Prior Publication Data
US 2022/0114069 A1 Apr. 14, 2022

Related U.S. Application Data

(63) Continuation of application No. 16/818,327, filed on Mar. 13, 2020, now Pat. No. 11,204,849.

(51) Int. Cl.
*G06F 11/267* (2006.01)
*G06F 11/22* (2006.01)
(Continued)

(52) U.S. Cl.
CPC .......... *G06F 11/267* (2013.01); *G06F 1/3296* (2013.01); *G06F 11/2236* (2013.01); *G06F 11/27* (2013.01); *G06F 11/2733* (2013.01)

(58) Field of Classification Search
CPC .................. G06F 11/267; G06F 1/3296; G06F 11/2236; G06F 11/27; G06F 11/2733
See application file for complete search history.

(56) References Cited

U.S. PATENT DOCUMENTS 5,355,369 A 10/1994 Greenberger et al.
5,598,421 A 1/1997 Tran et al.
(Continued)

FOREIGN PATENT DOCUMENTS

EP 1463352 A2 * 9/2004 ............ H04W 24/00
WO 02/01237 A2 1/2002

OTHER PUBLICATIONS

Gizopoulos, D., et al., "Architectures for Online Error Detection and Recovery in Multicore Processors," IEEE, 2011 Design, Automation and Test in Europe Conference, pp. 6 (Mar. 14, 2011).

*Primary Examiner* — Matthew M Kim
*Assistant Examiner* — Indranil Chowdhury
(74) *Attorney, Agent, or Firm* — Taylor English Duma L.L.P.

(57) ABSTRACT

In various examples, one or more components or regions of a processing unit—such as a processing core, and/or component thereof—may be tested for faults during deployment in the field. To perform testing while in deployment, the state of a component subject to test may be retrieved and/or stored during the test to maintain state integrity, the component may be clamped to communicatively isolate the component from other components of the processing unit, a test vector may be applied to the component, and the output of the component may be compared against an expected output to determine if any faults are present. The state of the component may be restored after testing, and the clamp removed, thereby returning the component to its operating state without a perceivable detriment to operation of the processing unit in deployment.

23 Claims, 6 Drawing Sheets

(51) Int. Cl.
*G06F 11/273* (2006.01)
*G06F 11/27* (2006.01)
*G06F 1/3296* (2019.01)

(56) References Cited

U.S. PATENT DOCUMENTS

| | | | |
|---|---|---|---|
| 5,781,560 | A | 7/1998 | Kawano et al. |
| 5,805,609 | A | 9/1998 | Mote, Jr. |
| 6,425,100 | B1 | 7/2002 | Bhattacharya |
| 7,184,932 | B1 | 2/2007 | Lopez et al. |
| 7,269,772 | B1 | 9/2007 | Li et al. |
| 7,818,640 | B1 | 10/2010 | Lerner |
| 10,922,203 | B1 * | 2/2021 | Alben ............... G06T 1/20 |
| 2002/0069386 | A1 | 6/2002 | Neeb |
| 2004/0222305 | A1 | 11/2004 | Learning |
| 2005/0060116 | A1 | 3/2005 | Yeung |
| 2009/0135961 | A1 | 5/2009 | Gemmeke et al. |
| 2010/0023820 | A1 | 1/2010 | Douskey et al. |
| 2010/0153797 | A1 | 6/2010 | Youm et al. |
| 2012/0159496 | A1 | 6/2012 | Dighe et al. |
| 2012/0216089 | A1 * | 8/2012 | Chen ............ G01R 31/3177 700/121 |
| 2012/0226942 | A1 * | 9/2012 | Gangasani ........... G06F 11/27 714/E11.169 |
| 2017/0154402 | A1 * | 6/2017 | Viggers ............... G06T 1/20 |
| 2019/0026205 | A1 | 1/2019 | Jin et al. |
| 2019/0162782 | A1 * | 5/2019 | Shanbhogue .... G01R 31/31721 |
| 2019/0171538 | A1 * | 6/2019 | Gulati ................ G01R 31/317 |
| 2019/0212799 | A1 | 7/2019 | Solki |
| 2019/0278677 | A1 * | 9/2019 | Terechko .......... G06F 11/2236 |
| 2021/0025938 | A1 | 1/2021 | Pöppe et al. |
| 2021/0165730 | A1 * | 6/2021 | Surya ............... G06F 11/0772 |
| 2021/0294791 | A1 * | 9/2021 | Narayanaswamy .. G06F 11/263 |

\* cited by examiner

LEVERAGING LOW POWER STATES FOR FAULT TESTING OF PROCESSING CORES AT RUNTIME

RELATED APPLICATIONS

This application is a continuation of U.S. patent application Ser. No. 16/818,327, entitled "Leveraging Low Power States For Fault Testing Of Processing Cores At Runtime" filed Mar. 3, 2020, which is incorporated herein by reference in its entirety.

BACKGROUND

To ensure safety during operation of processor-assisted tasks, safety systems—such as automotive safety systems, medical device safety systems, and/or other safety systems—may be required to test for faults of processing cores. Where faults are detected, the particular component wherein the fault is located (e.g., a graphics processing unit (GPU), a central processing unit (CPU), or a sub-component thereof) may be deemed faulty. Once deemed faulty, the component may be removed, repaired, or even destroyed— or its output discounted—such that the component does not pose a risk to the safe operation of the system.

Some conventional systems for checking for faults rely on factory testing of processing cores prior to deployment of the processing cores in the field. For example, prior to shipment, or upon receipt, the components of the system may be fault checked before deployment to its next destination and/or in the field. This process is timely and requires external test hardware and software that may be practical only in a testing environment (e.g., prior to deployment in the field). Other conventional systems have used functional testing—e.g., using functional test vectors—to validate that a circuit under test functions according to its functional specification. However, functional testing is more expensive to develop, and does not provide a suitable amount of fault coverage because functional tests do not take into account the internal logic of the system. By not accounting for the internal logic of the system, functional tests may provide inaccurate results that indicate there are no faults, when in reality there are faults present that were undetected—due to the lower fault coverage.

As yet another alternative, some conventional systems have used structural testing—e.g., using structural test vectors—to validate some or all of a system (e.g., a system-on-chip (SOC)). However, because structural testing is destructive to the state integrity of the system, structural testing in these conventional systems—even for built-in self-test (BIST) applications—is limited to testing during the power-on state, prior to operation or at (or during) the power-off state. Due to the potential for latent faults to surface during operation, and/or as a result of test specifications requiring testing at a specific interval (e.g., testing for 5 milliseconds every 100 milliseconds), performing structural testing only at power-on or power-off may not provide the most effective—or sufficient—level of fault testing.

SUMMARY

Embodiments of the present disclosure relate to leveraging low power states for fault testing of processing cores at runtime. Systems and methods are disclosed for performing fault testing—including structural fault testing—on processing cores during low power or sleep states during deployed operation in the field.

In contrast to conventional systems, such as those described above, fault testing within the present disclosure may leverage low power or sleep states—including power-on or power-off states—of components to perform testing while preserving state integrity of the component. For example, when a component enters a low power or sleep state, state information of the component may be retrieved and stored, the component may be clamped or isolated from communication with other components of the device, and a test system may perform fault testing on the component. The fault testing may include applying one or more test vectors to the component, receiving an output from the component, and confirming whether the output matches a desired signature. Once the test is complete, the state information may be reloaded to the component and the clamp may be removed, thereby placing the component back into an operating condition within the deployed system. As such, the fault testing of the present disclosure enables a component to be tested during an idle or low power state without interfering with operation of the system, while preserving the state integrity of the component.

In some embodiments, a set of components may be subject to fault testing during deployment in the field. However, at least a subset of the set of components may need to be in operation for the system to operate safely and effectively. As such, an idleness, low power, or sleep state of each component of the set of components may be monitored by a test system, and testing may be performed on one or more of the components during such states. Data representing the completion of the tests for the components of the set may be monitored and, during each iteration of testing, components of the set may be tested—during an idle, low power, or sleep state—until each of the components has been tested. As a result, each of the components of the system may be tested without having an effect on the operation— and thus the safety—of the system.

BRIEF DESCRIPTION OF THE DRAWINGS

The present systems and methods for leveraging low power states for fault testing of processing cores at runtime are described in detail below with reference to the attached drawing figures, wherein.

DETAILED DESCRIPTION

Systems and methods are disclosed related to leveraging low power states for fault testing of processing cores at runtime. The systems and methods of the present disclosure may be suitable for fault testing processing cores in any application, such as automotive applications (e.g., autonomous or semi-autonomous driving applications), high performance computing applications, cloud computing applications, medical applications such as imaging, radiology, gene sequencing, etc., and/or other applications where fault testing may be performed on processing cores. The fault testing described herein may be performed on any type of processing cores and/or component thereof, such as graphics processing units (GPUs), central processing units (CPUs), graphics processing cluster (GPCs), texture processing clusters (TPCs), streaming multiprocessors (SMs), tree traversal units (TTUs), deep learning accelerators (DLAs), arithmetic-logic units (ALUs), floating point units (FPUs), input/output (I/O) elements, peripheral component interconnect (PCI) or peripheral component interconnect express (PCIe) elements, and/or the like. In addition, the fault testing described herein may be performed on a single processing core (or other elements) or multiple processing cores (or other elements), or may be performed on one or more processing cores (or other elements) at any one time (e.g., using parallel processing).

Figure 1:
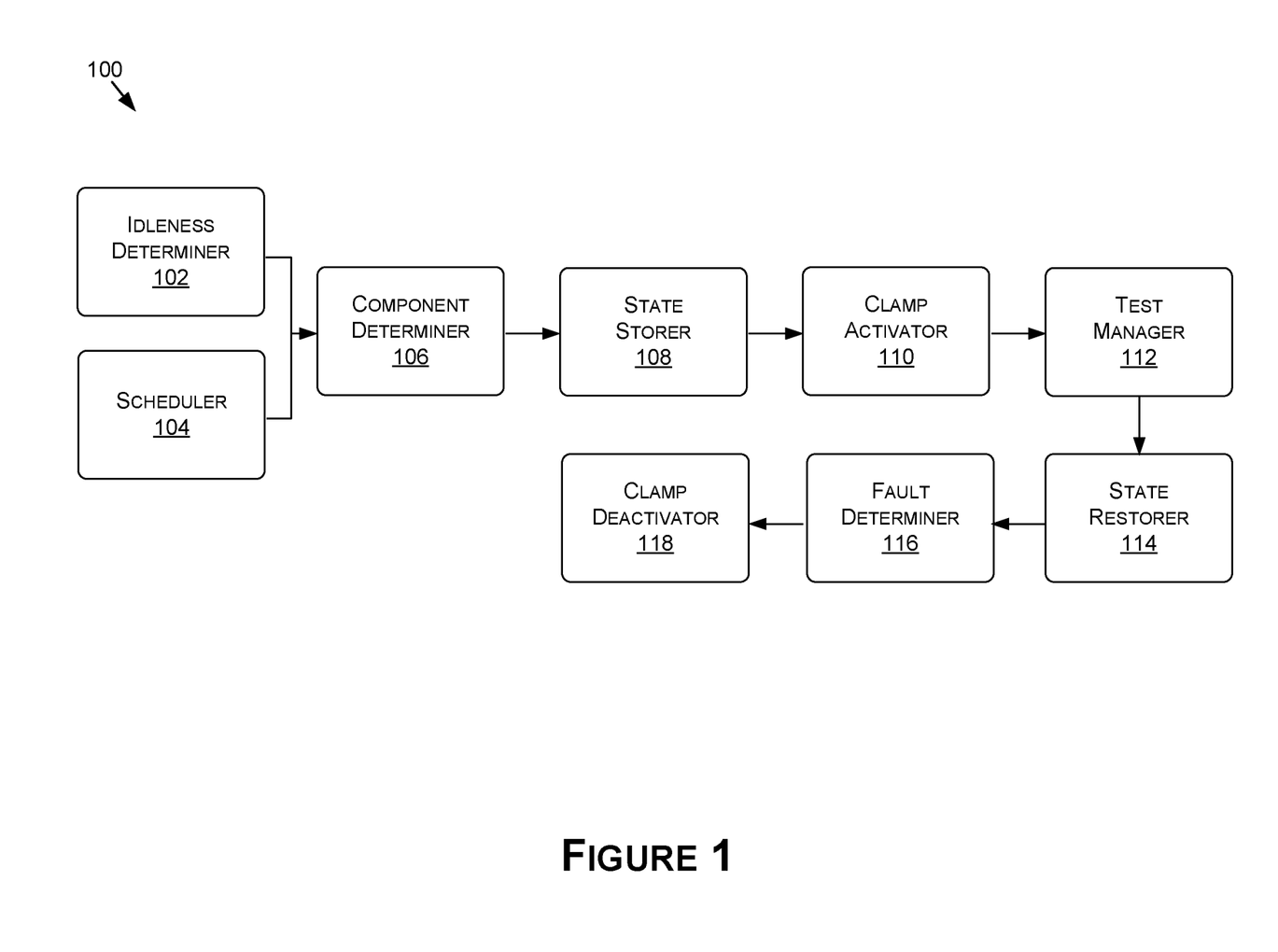
FIG. 1 is a data flow diagram showing a process for testing one or more components of a processing unit, in accordance with some embodiments of the present disclosure.

Now referring to FIG. 1, FIG. 1 is a data flow diagram showing a process 100 for testing one or more components of a processing unit, in accordance with some embodiments of the present disclosure. The process 100 may be described herein with respect to test system 200 of FIGS. 2A and 2B, however, this is not intended to be limiting. For example, and without departing from the scope of the present disclosure, the process 100 may be implemented or executed with respect to any testing environment or system, such as with respect to any test environment or system that includes one or more processing units, processing cores, and/or components or subcomponents thereof.

Figure 2A:
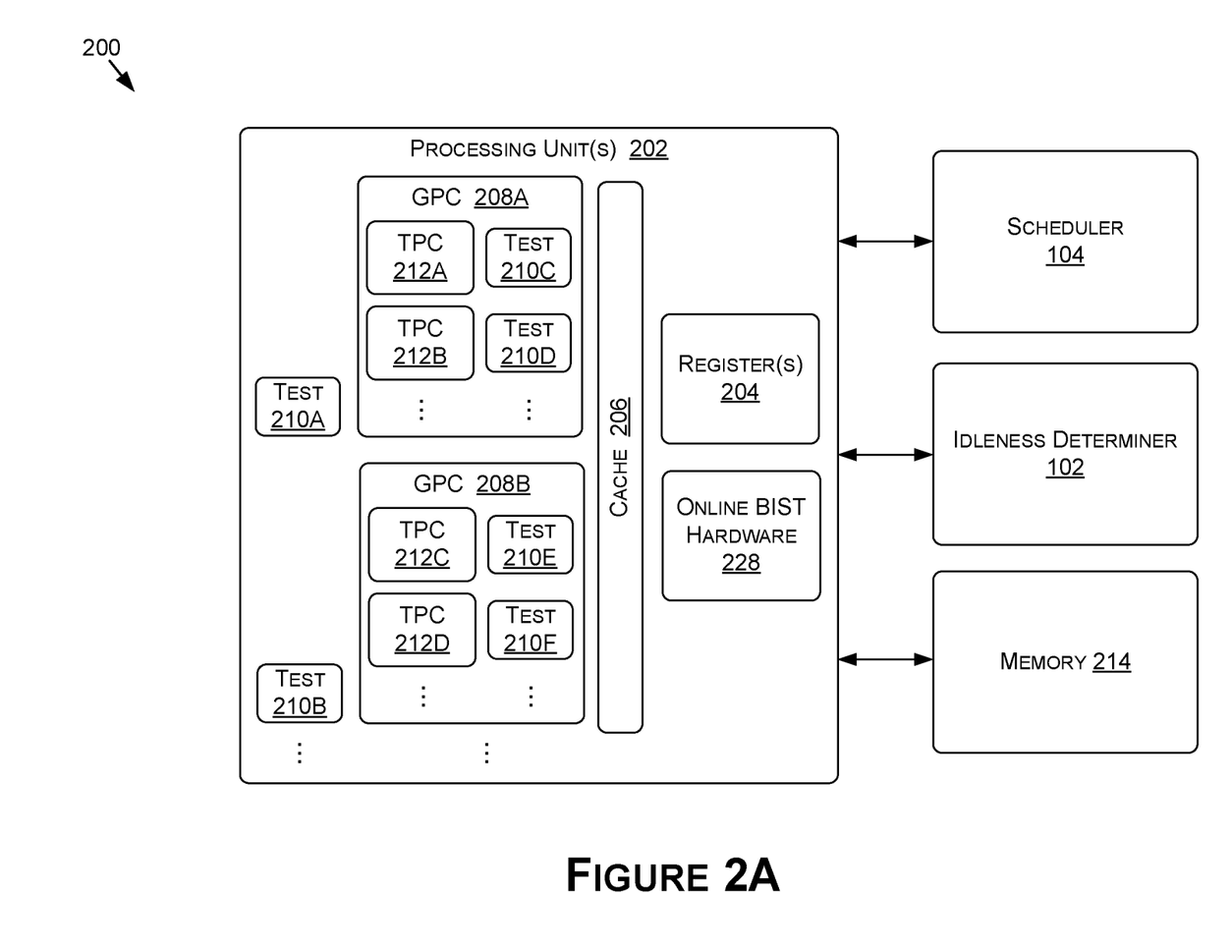
FIG. 2A is an example of a test system for testing one or more components of a processing unit, in accordance with some embodiments of the present disclosure.
Figure 2B:
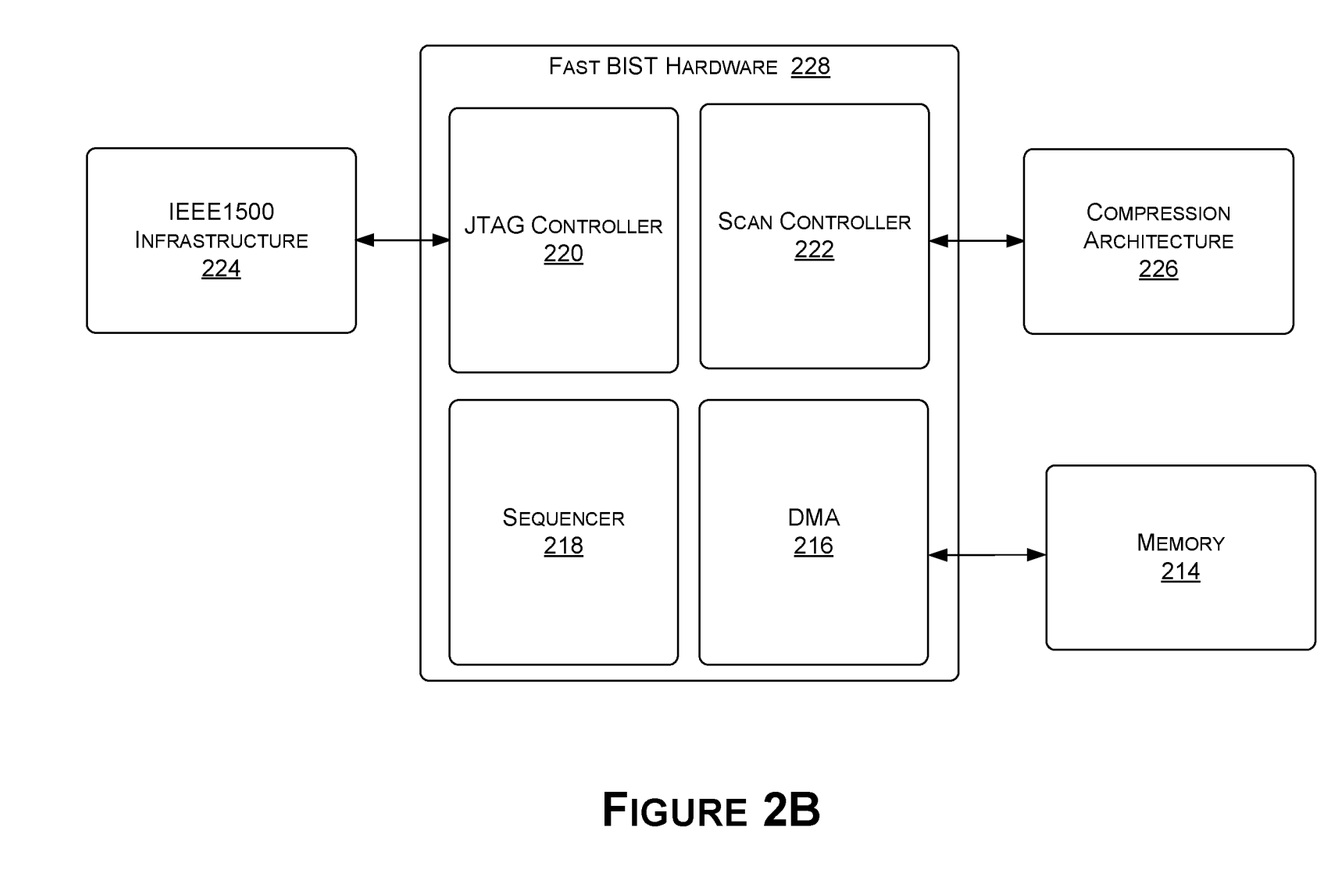
FIG. 2B is an example of a test component for a test system used for testing one or more components of a processing unit, in accordance with some embodiments of the present disclosure.

FIGS. 2A and 2B represent examples of the test system 200 for testing one or more components of a processing unit, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Referring again to the process 100 of FIG. 1, a determination may be made as to which component(s) is to be tested at any given time. For example, during any iteration of built-in self-test (BIST), each of the components subject to test may be tested, or be required to be tested to be in compliance with one or more test specifications, guidelines, or standards (e.g., internal or external)—such as the ISO 26262 functional safety standard with respect to autonomous driving applications. As such, the specifications, guidelines, or standards may dictate that—when an autonomous vehicle is in use, when an imaging device is in use, etc.—testing must be performed periodically (e.g., every x milliseconds) or after certain thresholds have been reached (e.g., every y number of driven miles/kilometers, upon reaching speeds above a certain rate). As such, the component(s) may be tested according to these rules.

During deployment, each of the components of a system may not be in use at all times. During these idle periods, the components of the system may be placed into a low power state, an idle state, a sleep state, and/or another state type where the components are not fully active within the system—e.g., a power-on or power-off states. When in a low power, idle, or sleep state, power gating and/or rail gating may be used to temporarily withhold power from reaching the component(s). In embodiments of the present disclosure, instead of putting one or more of the components directly into a low power, sleep, or idle state, the component may be tested—e.g., using the test system 200.

To determine which component(s) is to be tested at a given time, various approaches may be used. In some non-limiting embodiments, an idleness determiner 102 may be used to monitor for and/or detect when a component(s) is in a sleep, low power, or idle state, and/or is about to enter a sleep, low power, or idle state. Once a component(s) is identified as being in, or about to enter, such as state, the component(s) may be selected for testing. The idleness determiner 102, or another component of the test system 200, may track which components have been tested in a given iteration, or over a given test period, to ensure that each of the components subject to test are tested at least once during the iteration or the test period. In some examples, where each of the components do not enter an idle, low power, or sleep state during the iteration or test period, a scheduler 104 (and/or another component of the test system 200), as described in more detail herein, may be used to initiate testing on the component(s) during the iteration or test period to ensure compliance with any test specifications, guidelines, or standards. As such, in some embodiments, the idleness determiner 102 and the scheduler 104 may be used in tandem to ensure each of the components are subject to test during each iteration or test period.

The idleness determiner 102 may identify more than one component at a time that is available and/or ready for test and, because testing may be performed in parallel, in embodiments, the idleness determiner 102 may trigger testing of each of the available components—such that each component is tested substantially simultaneously, or is tested during a period of time that overlaps with another period(s) of time of one or more other components. In addition, because the test system 200 may include test components 210 for each component subject to test and/or test components for groups of components, a test component(s) 210 selected to execute the test may differ. For example, where an entire GPC is available for test (as determined by the idleness determiner 102), the entire GPC may be tested using a test component—such as test component(s) 210A of FIG. 2A. By using the test component(s) 210A, each of the TPC(s) 212 of the GPC 208A may be tested during the test of the GPC 208A. As another example, such as where the entire GPC 208A is not available and/or ready for test, one or more of the TPCs 212 of the GPC 208A may be tested (e.g., using respective test components 210, where present), while other TPCs 212 of the GPC 208A may not be tested. Similarly, where an entire processing unit, such as processing unit(s) 202 of FIG. 2A, is in or about to enter a low power, sleep, or idle state, the entire processing unit(s) 202 may be tested substantially simultaneously or during an overlapping period(s) of time. In such an example, a single test component (not shown) may be used to test the entire processing unit(s) 202, or each test component(s) 210 of the processing unit(s) 202 (e.g., test components 210 for each GPC 208, test components for each TPC 212, and/or other test components) may be used to test the processing unit(s) 202.

For example, with respect to an autonomous vehicle, when on a highway, one or more of the processing units 202 or components thereof may not be needed by the system to operate (e.g., because highway driving may be less processing intensive than city driving). As such, a larger portion of the components, or the entire processing unit(s) 202, may be tested during highway driving. However, when entering a city, the processing requirements of the system may be increased, thereby rarely or never resulting in the processing unit(s) 202, or components thereof, being offline. As such, when in a city, the scale of the testing performed on the processing unit(s) 202 may be decreased, resulting in a smaller number of the components of the processing unit(s) 202 being tested at any one time in order to ensure an adequate amount of processing components are available to safely control the autonomous vehicle.

As another example, the scheduler 104 may be used to determine which component(s) to test at a given time. For example, the components subject to testing may be tested according to an order or schedule. The schedule may be fixed for each iteration or test period, or may be dynamic depending on any number of factors—such as a current state of operation of the system, results of prior tests, current processing requirements, and/or other factors. Once a schedule is determined for a given iteration or test period, the scheduler 104 may trigger testing of one or more components of the system—such as one or more components of the processing unit(s) 202 of the test system 200. Similar to the description herein with respect to the idleness determiner 102, the scheduler 104 may trigger testing of any number of components substantially simultaneously or during overlapping periods of time, and may trigger any number of test components 210—such as test components 210 for groups of components of the processing unit(s) 202, test components for each respective component of the processing unit(s) 202, or a combination thereof.

A component determiner 106 may use the output of the idleness determiner 102 and/or the scheduler 104, as described herein, to determine which component(s) of the system to test. For example, the idleness determiner 102 and/or the scheduler 104 may generate signals or messages that indicate the components (and/or the test components 210 associated therewith) that are to be tested and/or when the components are to be tested. In response, or based on the signals or messages, the component determiner 106 may determine the components to be tested.

During testing, the state of component(s) subject to test may be altered, changed, or overwritten, thereby destroying the state integrity of the component(s). As such, after testing, if the component(s) were placed back into operation, valuable state information may have been lost thereby potentially reducing the accuracy or safety of the system. To account for this, a state storer 108 may be used prior to testing to retrieve and/or store the state information from the component(s) subject to test and store the state information during the period of time that the test(s) is being performed on the component(s). By storing the state information during the test, a state restorer 114 may be used to restore the state information to the component(s) after testing is completed. As such, once the component(s) are put back into operation, the state of the component(s) appears unchanged to the system, thereby ensuring continuity, accuracy, and the safety of the system. With reference to FIG. 2A, the state information may be retrieved from a component(s) of the system (e.g., from a GPC 208, a TPC 212, etc.), and stored in the memory 214. The memory 214 may include dynamic random-access memory (DRAM), in some non-limiting embodiments, and the state information of the component(s) may be stored in the DRAM during testing. In other examples, additional or alternative types of memory may be used, such as those described herein with respect to FIG. 5.

A clamp activator 110 may apply a clamp to a component(s) to be tested to at least communicatively isolate the component(s) from other components(s) of the system (e.g., other components in communication with the component during use, such as to isolate the GPC 208A from cache 206 and GPC 208B). When a clamp is activated or applied, communication between the component and components of the test system (e.g., the test components 210, the scheduler 104, the idleness determiner 102, memory 214, etc.) may be established and/or maintained. As such, instead of entering or continuing in a low power, sleep, or idle state (e.g., as a result of power gating, rail gating, sleeping, etc.), the component(s) to be tested may undergo testing (e.g., using structural test vectors, functional test vectors, BIST, Fast BIST, Online BIST, deterministic automatic test pattern generation (ATPG), logic BIST (LBIST), memory BIST (MBIST), a combination thereof, and/or other test types). When the clamp is applied, to other components of the system that were previously in communication with, or were communicatively coupled to, the component now subject to test, it may appear that the component is in a low power, sleep, or idle state.

During the testing, and while clamped, the component(s) access to power may be undisturbed. As such, the power supply and/or power source to the component(s) prior to, during, and/or after the testing may remain unchanged. This may be in contrast to conventional systems that use an external test system, where power is removed from within the system during testing, and an external power source from the external test system is used to provide power to the component during testing.

A test manager 112 may manage testing of the component(s) subject to test. Prior to testing, in some embodiments, the state of the component(s) to be tested may be reset. As such, the test vectors applied to the component(s) may be applied to the component(s) when the state is reset. The resetting of the state may be to random values, to default values, and/or to pre-test values (e.g., values corresponding to starting values for the test). The reset may be to the hardware and/or the software associated with the component(s), such as to reset the entire domain that is to be tested. The test manager 112 may then trigger the test on the component(s) to be tested. The test manager 112 may indicate a type of test to be conducted, the component(s) (or test components corresponding thereto) to be tested, a location of the test data, a location to store the results of the test, an expected result of the test for each component, and/or other test information. The test information, with respect to the test system 200 of FIGS. 2A and 2B, may be stored in the memory 214, such as DRAM, flash memory, and/or another memory type.

Once a test component(s) 210 is determined (e.g., by the idleness determiner 102, the scheduler 104, the component determiner 106, and/or another component) that is to be used for performing the test, the test manager 112 may trigger the testing. In some examples, such as where Online BIST (alternatively referred to as inline testing or periodic testing) is executed, Online BIST hardware 228 (alternatively referred to herein as "Fast BIST hardware 228") may communicate with a scanning infrastructure, a data infrastructure, an MBIST infrastructure, an LBIST infrastructure, and/or interface with different register(s) 204. For example, the Online BIST hardware 228 may interface with the register(s) 204 to program different register(s) 204 for different paths, to set clocks, to perform resets, to program clamps, to pull test data back into the memory 214 after testing, to retrieve state information, to restore state information, etc. The Online BIST hardware 228 and the register(s) 204 may thus act as an intermediary between the test components of the processing unit(s) 202 and the external test components, such as the scheduler 104, the idleness determiner 102, the memory 214, and/or other components. In addition, although the test component(s) 210 and the Online BIST hardware 228 are illustrated as being a component of the processing unit(s) 202 (e.g., as a component of a system-on-chip (SOC)), this is not intended to be limiting. In some non-limiting embodiments, one or more of the test component(s) 210 and/or the Online BIST hardware 228 may be external to the processing unit(s) 202 (e.g., as an external component(s) to the SOC). Further, although illustrated as Online BIST hardware 228, this is not intended to be limiting. In non-limiting embodiments, the Online BIST hardware 228 may instead be MBIST hardware, LBIST hardware, structural test hardware, functional test hardware, and/or another test hardware type depending on current embodiment, and the type of testing being performed. As such, the Online BIST hardware 228 (or other test hardware type) may communicate with the test manager 112 (and/or other components defined with respect to the process 100) to execute testing on one or more components of the test system 200.

In some non-limiting embodiments, structural testing may be performed on the processing unit(s) 202, processing core(s), and/or components or subcomponents thereof. Structural testing may be used to identify any defect, such as a systematic defect, in the processing unit(s) 202. Using structural testing, as opposed to functional testing, may provide an advantage for defect localization. For example, functional testing may result in an identification of the presence of a defect, but because functional testing is focused on executing an instruction agnostic to the internal logic of the component (e.g., the organization or structure of flip flops), the actual location of the defect may be unknown. In addition, functional testing may only require a result be produced, but again, due to functional testing being internal logic agnostic, there is no requirement or knowledge of an amount of logic of a particular component that is being used to produce the result. As such, fault coverage with respect to functional testing is reduced when compared to fault coverage for structural testing. Thus, even though functional testing may be used in some embodiments without departing from the scope of the present disclosure, structural testing may be used in other embodiments to increase fault coverage in addition to increasing the likelihood of fault location detection. For example, because the internal logic of the component may be known, and the structural test may account for this, a location of a fault in a cluster of flip flops may be identified as a result of the output produced by the component after processing the structural test vector(s).

Where structural testing is used, structural test vector(s) may be applied to the component(s) to be tested by the associated test component(s) 210 and/or Online BIST hardware 228. In addition to using structural testing, the structural testing may be performed as part of an in-system test (IST) functionality, meaning that the structural tests are actually performed during operation of the system—e.g., not just performed when offline, or during power up or power down. A location (e.g., within the memory 214) of the test vectors to be applied to any single component may be known to the scheduler 104, the idleness determiner 102, the component determiner 106, the test manager 112, and/or another component, and prior to the test, data representing this location may be passed to the test component(s) 210 and/or the Online BIST hardware 228. Once the location is known, the test component(s) 210 and/or the Online BIST hardware 228 may retrieve the test information from the location. Once received, the test vectors may be applied to the component(s), the component(s) may process the test vectors, and the component(s) may produce a result.

To perform the testing, the Online BIST hardware 228 may be used, as illustrated at least with respect to FIG. 2B. Although illustrated as the Online BIST hardware 228, this is not intended to be limiting. In some embodiments, the Online BIST hardware 228 may be one or more of the test component(s) 210, or may be another type of test hardware, such as but not limited to those described herein.

As a non-limiting example, the Online BIST hardware 228 may include direct memory access 216 that may retrieve test data from the memory 214, transmit results of tests to the memory 214, transmit state information to the memory 214, retrieve the state information from the memory 214, and/or perform other memory access and communication operations. A sequencer 218, which may be a collection of state machines in some non-limiting embodiments, may act as a packet decoder. For example, the memory 214 may store packets of data, where different packets may correspond to or represent different information corresponding to tests. For example, the packets may represent MBIST test information, LBIST test information, SCAN test information, information for applying or removing clamps, clock program information, and/or other test information. The sequencer 218 may identify what the packets are, and may communicate with a JTAG controller 220 and/or a scan controller 222. The JTAG controller 220 may interface with an IEEE1500 infrastructure, in some embodiments, while the scan controller 222 may interface with a compression architecture 226 (e.g., for test compression to focus on significant values for reducing the time and cost of testing). The Online BIST hardware 228, the test component(s) 210, and/or other test components may include the components illustrated in FIG. 2B, or may include additional and/or alternative components other than those illustrated in FIG. 2B, without departing from the scope of the present disclosure.

Once the results are generated, the results may be stored on the test component(s) 210, on the Online BIST hardware 228, and/or stored in the memory 214. For example, where stored on the test component(s) 210 and/or the Online BIST hardware 228, the test component(s) 210 and/or the Online BIST hardware 228 may also store an expected results, or "golden signature", for comparison to the actual results output by the component(s). In such an example, the expected results may always be the same, and so they may be store permanently on the test component(s) 210 and/or the Online BIST hardware 228. As an alternative, such as where the tests vary for any given component(s), the expected results may be received and stored by the test component(s) 210 and/or the Online BIST hardware 228 prior to, during, or after completion of the testing. As another example, such as where the expected results are stored in the memory 214 (e.g., in a DRAM), the actual results may be stored in the memory 214 after testing for comparison to the expected results.

In non-limiting embodiments, once the actual results are generated by the component(s) undergoing testing, the actual results may be compared to the expected results by a fault determiner 116 to determine a pass or fail, and/or to determine a level of degradation (e.g., based on processing speeds). In some embodiments, where a failure is determined, the system may identify a location of the failure or defect that caused the failure in the component(s). For example, because structural test vectors may be based on internal logic of the component(s), the results generated by the component(s) may be indicative of a location of a fault. In some non-limiting embodiments, the expected results may be representative of an amount of time within which a certain component(s) should process the test vector. In such examples, the actual results may be representative of an amount of time the component(s) took to process the test vector, and this actual amount of time may be compared to the expected amount of time to determine a speed degradation of the component(s). As such, when a difference in the processing times is greater than a threshold, the presence of a fault in a component(s) may be determined; in further embodiments, the location of the fault may also be determined.

Upon completion of the test for a particular component(s), the state information that was retrieved from the component(s) by the state storer 108 may be retrieved from the memory 214 and used to restore the state of the component(s) by a state restorer 114. As such, the component(s) that were tested may be returned to a pre-test state—thereby preserving state integrity—and a clamp deactivator 118 may deactivate the clamp. By deactivating or removing the clamp, the component(s) that were tested may be returned to normal operation within the system. In some embodiments, a deployed status of the component(s) may be determined prior to returning to normal operation, such that the component(s) are reactivated according to their deployed status. For example, the deployed status may include active (e.g., to be used immediately for processing), sleep, idle, low power, and/or another deployed status. As such, the testing may be performed on the component(s) and, after completion, the component(s) may be returned to the deployed status (which may be different than the deployed status of the component(s) prior to testing). For example, where a component(s) was in a low power state prior to testing, the component(s) may be needed for an active state after the testing and, as a result, the component(s) may be reactivated in the active state after testing is completed and the clamp is deactivated.

Figure 3:
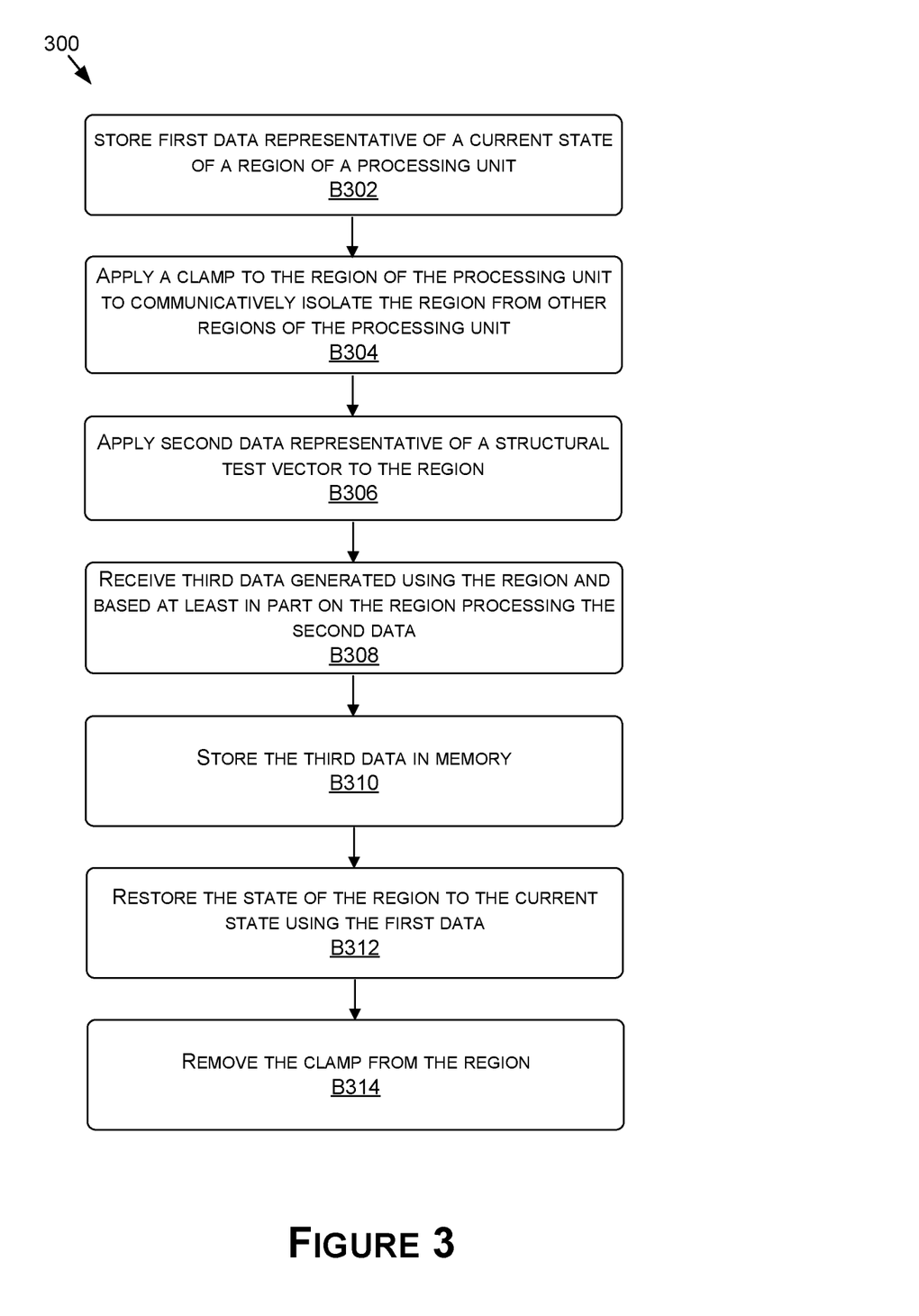
FIG. 3 is a flow diagram showing a method for testing at least one component of a processing core, in accordance with some embodiments of the present disclosure.
Figure 4:
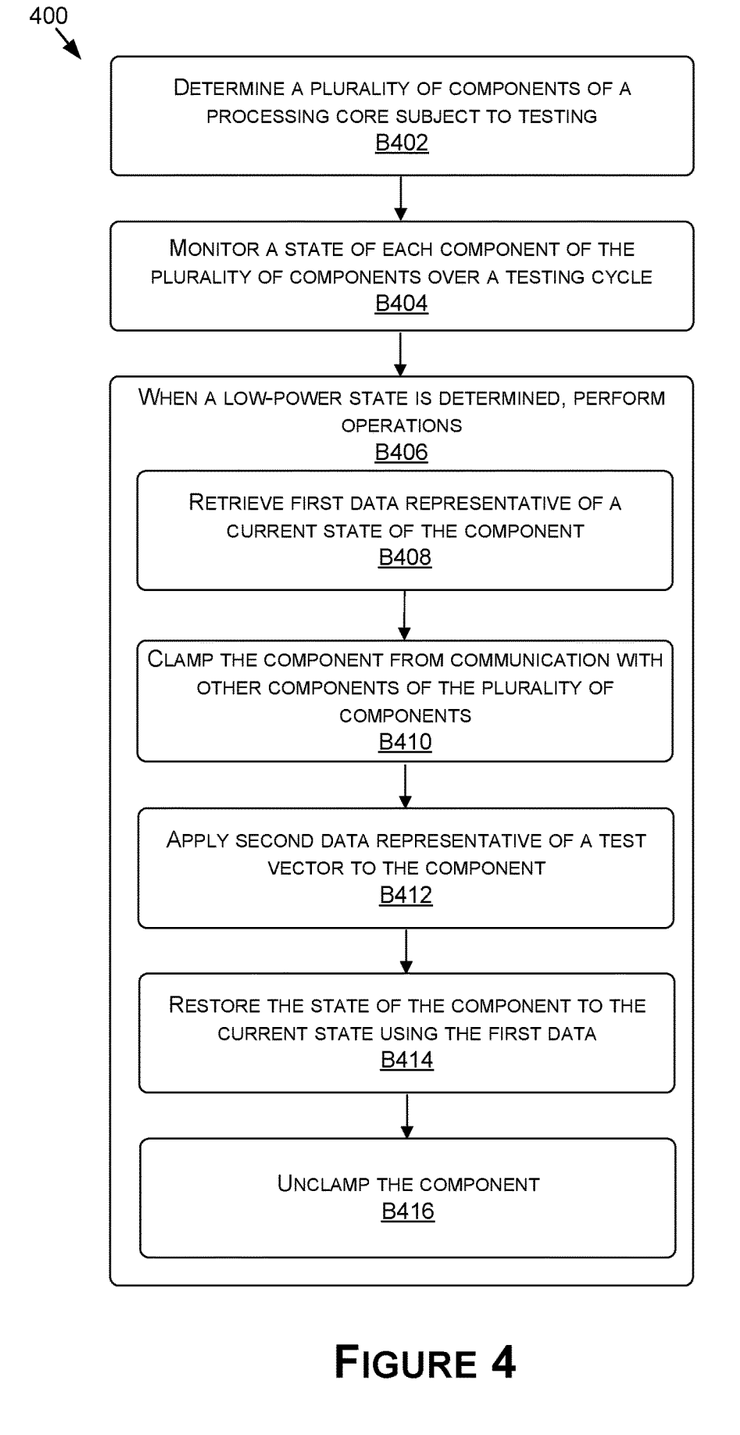
FIG. 4 is a flow diagram showing a method for testing multiple components of a processing core using idleness determinations corresponding to the components, in accordance with some embodiments of the present disclosure.

Now referring to FIGS. 3 and 4, each block of methods 300 and 400, described herein, comprises a computing process that may be performed using any combination of hardware, firmware, and/or software. For instance, various functions may be carried out by a processor executing instructions stored in memory. The methods 300 and 400 may also be embodied as computer-usable instructions stored on computer storage media. The methods 300 and 400 may be provided by a standalone application, a service or hosted service (standalone or in combination with another hosted service), or a plug-in to another product, to name a few. In addition, methods 300 and 400 are described, by way of example, with respect to the process 100 of FIG. 1 and the test system 200 of FIGS. 2A and 2B. However, this method may additionally or alternatively be executed by any one system, or any combination of systems, including, but not limited to, those described herein.

FIG. 3 is a flow diagram showing a method 300 for testing at least one component of a processing core, in accordance with some embodiments of the present disclosure. The method 300, at block B304, includes storing first data representative of a current state of a region. For example, the state storer 108 may retrieve current state information from the component(s) subject to test.

The method 300, at block B304, includes applying a clamp to the region of a processing unit to communicatively isolate the region from other regions of the processing unit. For example, the clamp activator 110 may apply a clamp to a region, or component(s), of the processing unit(s) 202 to communicatively isolate the region from other regions of the processing unit(s) 202. As such, the component(s) that are isolated may no longer be able to communicate—e.g., the GPC 208A may no longer be able to communicate with the GPC 208B via the cache 206 once a clamp is applied to the GPC 208A during testing of the GPC 208A.

The method 300, at block B306, includes applying second data representative of a structural test vector to the region. For example, the test manager 112 may apply, via the test component(s) 210 and/or the Online BIST hardware 228, a test vector—such as a structural test vector—to the component(s) undergoing testing.

The method 300, at block B308, includes receiving third data generated using the region and based at least in part on the region processing the second data. For example, the results of the component(s) processing the test vector(s) may be received.

The method 300, at block B310, includes storing the third data in memory. For example, the results may be stored in the memory 214, in memory of the test component(s) 210 executing the tests, and/or in memory of the Online BIST hardware 228.

The method 300, at block B312, includes restoring the state of the region to the current state using the first data. For example, a state of the component(s) after testing may be restored by the state restorer 114 to the current state that was extracted from the component(s) prior to testing to preserve state integrity of the component(s) prior to reactivating the component(s).

The method 300, at block B314, includes removing the clamp from the region. For example, the clamp deactivator 118 may remove or deactivate the clamp from the component(s) that were tested.

FIG. 4 is a flow diagram showing a method 400 for testing multiple components of a processing core using idleness determinations corresponding to the components, in accordance with some embodiments of the present disclosure. The method 400, at block B402, includes determining a plurality of components of a processing core subject to testing. For example, a plurality of components of the processing unit(s) 202, a processing core(s), and/or components or subcomponents thereof may be determined.

The method 400, at block B404, includes monitoring a state of each component of the plurality of components over a testing cycle. For example, the idleness determiner 102 may monitor a state of the component(s) to be tested within the testing cycle to determine when the component(s) enter a low power, idle, or sleep state.

The method 400, at block B406, includes, when a low power state is determined, performing one or more of the operations 408, 410, 412, 414, and/or 416. For example, once a low power, sleep, or idle state is determined by the idleness determiner 102, testing may be performed on the component(s).

The method 400, at block B408, includes storing first data representative of a current state of the component. For example, the state storer 108 may retrieve current state information from the component(s) subject to test.

The method 400, at block B410, includes clamping the component from communication with other components of the plurality of components. For example, the clamp activator 110 may apply a clamp to the component(s) subject to test to communicatively isolate the component(s) from other component(s) of the processing unit(s) 202.

The method 400, at block B412, includes applying second data representative of a test vector to the component. For example, the test manager 112 may apply, via the test component(s) 210 and/or the Online BIST hardware 228, a test vector—such as a structural test vector or a functional test vector—to the component(s) undergoing testing.

The method 400, at block B414, includes restoring the state of the region to the current state using the first data. For example, a state of the component(s) after testing may be restored by the state restorer 114 to the current state that was extracted from the component(s) prior to testing to preserve state integrity of the component(s) prior to reactivating the component(s).

The method 400, at block B416, includes unclamping the component. For example, the clamp deactivator 118 may remove or deactivate the clamp from the component(s) that were tested.

Figure 5:
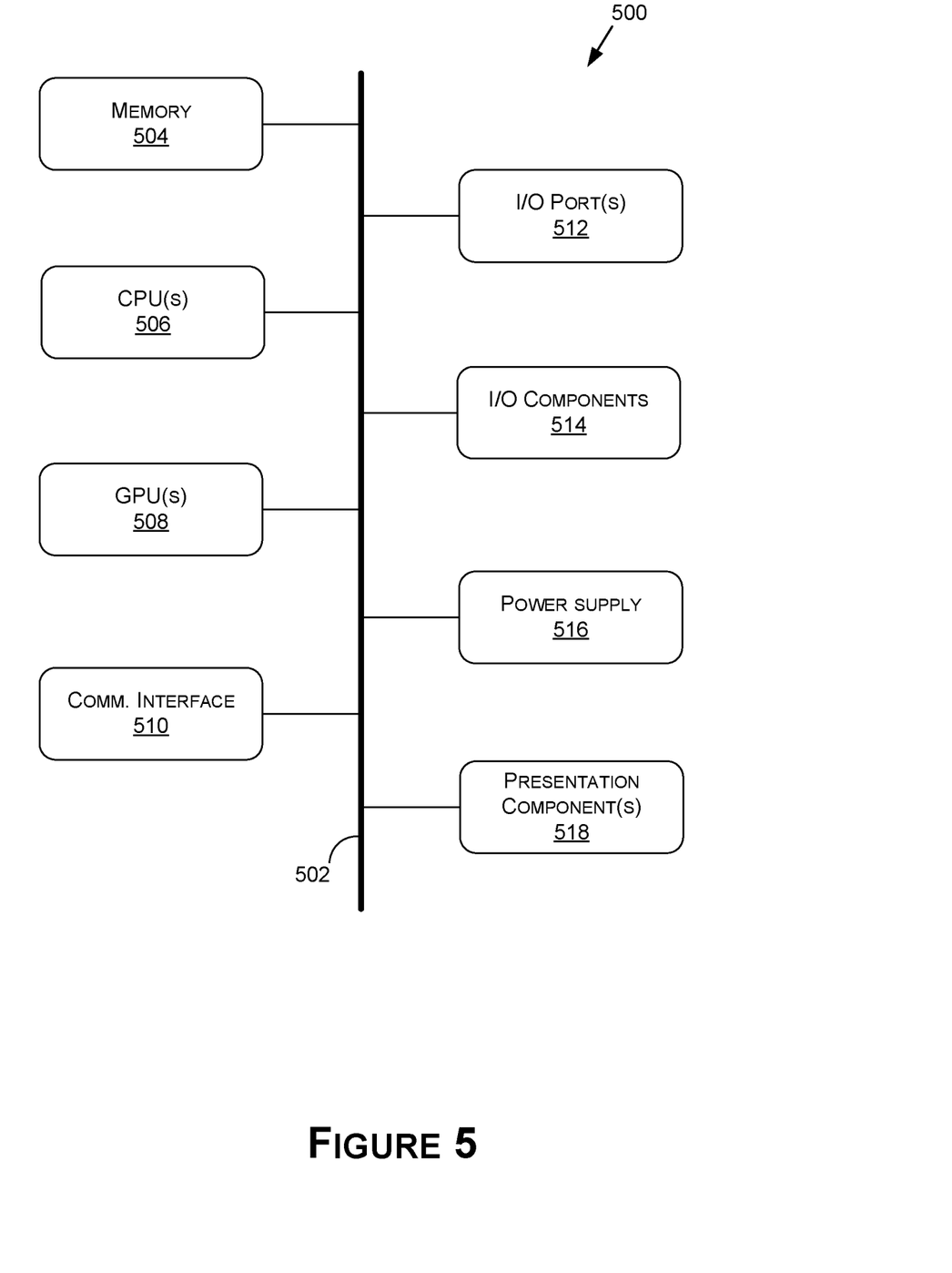
FIG. 5 is a block diagram of an example computing device suitable for use in implementing some embodiments of the present disclosure.

FIG. 5 is a block diagram of an example computing device 500 suitable for use in implementing some embodiments of the present disclosure. Computing device 500 may include a bus 502 that directly or indirectly couples the following devices: memory 504, one or more central processing units (CPUs) 506, one or more graphics processing units (GPUs) 508, a communication interface 510, input/output (I/O) ports 512, input/output components 514, a power supply 516, and one or more presentation components 518 (e.g., display(s)).

Although the various blocks of FIG. 5 are shown as connected via the bus 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "handheld device," "game console," "electronic control unit (ECU)," "virtual reality system," and/or other device or system types, as all are contemplated within the scope of the computing device of FIG. 5.

The bus 502 may represent one or more busses, such as an address bus, a data bus, a control bus, or a combination thereof. The bus 502 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 500. The memory 504 may be similar to the memory 214, in some embodiments, such that the test results, the test information, and/or other information for performing, saving, or analyzing the testing of the processing unit(s) 202 may be stored, at least temporarily, in the memory 504. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 506 may be configured to execute the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an ARM processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors. In some examples, the processing unit(s) 202 may include one or more of the CPUs 506, and one or more subcomponents thereof. As such, the test hardware 210 may be used to test the CPUs 506, such as to test one or more components or subcomponents thereof. There may be any number of discrete test hardware 210 to perform the testing of the CPUs 506.

The GPU(s) 508 may be used by the computing device 500 to render graphics (e.g., 3D graphics). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data. The display memory may be included as part of the memory 504. The GPU(s) 708 may include two or more GPUs operating in parallel (e.g., via a link). When combined together, each GPU 508 may generate pixel data for different portions of an output image or for different output images (e.g., a first GPU for a first image and a second GPU for a second image). Each GPU may include its own memory, or may share memory with other GPUs. In some examples, the processing unit(s) 202 may include one or more of the GPUs 508, and one or more subcomponents thereof. As such, the test hardware 210 may be used to test the GPUs 508, such as to test one or more components or subcomponents thereof. There may be any number of discrete test hardware 210 to perform the testing of the GPUs 508.

In examples where the computing device 500 does not include the GPU(s) 508, the CPU(s) 506 may be used to render graphics.

The communication interface 510 may include one or more receivers, transmitters, and/or transceivers that enable the computing device 700 to communicate with other computing devices via an electronic communication network, included wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 512 may enable the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may be include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including handheld devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   transmitting, to a testing component of a processing unit, a first indication to test a first component of the processing unit at a first interval of time according to a schedule, the schedule generated based at least in part on a first state corresponding to the first component; and
   transmitting a second indication to the testing component to test a second component of the processing unit at a second interval of time according to the schedule, the second interval of time determined based at least in part on a second state corresponding to the first component, the second state being a different state than the first state.

2. The method of claim 1, wherein the transmitting, to the testing component of the processing unit, the first indication to test the first component further comprises causing the testing component to:
store state information of the first component;
isolate the first component from at least one other component of a set of components;
perform a testing of the first component by at least obtaining a result generated by the first component; and
restore the state information to the first component.

3. The method of claim 2, wherein the transmitting, to the testing component of the processing unit, the first indication to test the first component causes the testing component to execute at least one of a functional test or a structural test.

4. The method of claim 1, wherein the processing unit is a graphics processing unit (GPU) or a central processing unit (CPU).

5. The method of claim 1, wherein the first component and the second component includes at least one of: a texture processing cluster (TPC), a graphics processing cluster (GPC), a tree traversal unit (TTU), a deep learning accelerators (DLA), an arithmetic-logic unit (ALU), a floating point unit (FPU), an input/output (I/O) element, a peripheral component interconnect (PCI), a peripheral component interconnect express (PCIe), or a processing core of the processing unit.

6. The method of claim 1, wherein the processing unit further comprises a system-on-chip (SOC) and the testing component is separate from the processing unit.

7. The method of claim 1, wherein the schedule is dynamically generated in response to the first component changing from a previous state to the first state.

8. The method of claim 1, wherein the first state further comprises at least one of an idle state, a low power state, or a sleep state.

9. The method of claim 1, wherein the first component is a graphics processing cluster (GPC) and the second component is a texture processing cluster (TPC).

10. The method of claim 1, wherein power supplied to at least one sub-component of the first component is from a power source that supplies the power to the first component.

11. A processor comprising:
one or more processing units to:
generate a schedule to test a set of components of a processing core based at least in part on state information of components of the set of components; and
cause a testing component to execute a test of a first component of the set of components based at least in part on the schedule and state information associated with a second component indicating that the second component is not idle.

12. The processor of claim 11, wherein the one or more processing units are further to generate the schedule in response to a state change of a subset of components of the set of components.

13. The processor of claim 11, wherein the one or more processing units are further to test the first component by at least:
storing first data representative of a current state of the first component;
preventing the first component from communicating with at least one other component of the set of components;
applying a test vector to the first component;
obtaining a result generated by the first component based at least in part on the test vector;
restoring a state of the first component based at least in part on the first data; and
enabling the first component to communicate with the at least one other component.

14. The processor of claim 13, wherein preventing the first component from communicating with the at least one other component further comprises communicatively isolating the first component while maintaining a power supply to the first component and the at least one other component.

15. The processor of claim 11, wherein the test is a structural test.

16. The processor of claim 11, wherein the first component comprises a graphics processing cluster (GPC).

17. The processor of claim 11, the one or more processing units are further to test the first component by at least:
obtaining an output from the first component; and
comparing the output to an expected signature to determine a fault exists in the first component.

18. A system for built-in self-test (BIST) comprising:
one or more memory units storing instructions that, as a result of being executed by one or more processing units, cause the one or more processing units to:
cause a testing component of the one or more processing units to execute a first test of a first component of the one or more processing units based at least in part on a schedule generated based at least in part on a state of the first component and a first interval of time; and
cause the testing component to execute a second test of a second component of the one or more processing units based at least in part on the schedule and a second interval of time.

19. The system of claim 18, wherein the state further comprises a low-power state.

20. The system of claim 19, wherein the first interval of time and the second interval of time at least partially overlap.

21. The system of claim 19, wherein instructions further comprise instructions that, as a result of being executed by the one or more processing units, cause the one or more processing units to generate the schedule based at least in part on a state change of the first component during the first interval of time.

22. The system of claim 18, wherein the second component is a sub-component of the first component.

23. The system of claim 22, wherein instructions that cause the testing component to execute the second test of the second component further comprise instructions that, as a result of being executed by the one or more processing units, cause the one or more processing units to cause the testing component to execute the second test of the second component based at least in part on a result of the first test.

* * * * *